US011316352B2

(12) United States Patent
Hale (10) Patent No.: US 11,316,352 B2
(45) Date of Patent: Apr. 26, 2022

(54) BATTERY MANAGEMENT (71) Applicant: OXIS ENERGY LIMITED, Oxfordshire (GB)

(72) Inventor: Christopher Hale, Oxfordshire (GB)

(73) Assignee: Oxis Energy Limited, Abingdon-On-Thames (GB)

( * ) Notice: Subject to any disclaimer, the term of this patent is extended or adjusted under 35 U.S.C. 154(b) by 170 days.

(21) Appl. No.: 16/626,195

(22) PCT Filed: Jul. 5, 2018

(86) PCT No.: PCT/GB2018/051896
§ 371 (c)(1),
(2) Date: Dec. 23, 2019

(87) PCT Pub. No.: WO2019/008367
PCT Pub. Date: Jan. 10, 2019

(65) Prior Publication Data
US 2020/0119563 A1 Apr. 16, 2020

(30) Foreign Application Priority Data

Jul. 5, 2017 (GB) ..................... 1710818

(51) Int. Cl.
*H02J 7/00* (2006.01)
*H01M 10/052* (2010.01)
(Continued)

(52) U.S. Cl.
CPC ......... *H02J 7/0016* (2013.01); *H01M 10/052* (2013.01); *H01M 10/425* (2013.01);
(Continued)

(58) Field of Classification Search
USPC ....................................... 320/126
See application file for complete search history.

(56) References Cited

U.S. PATENT DOCUMENTS

2014/0091768 A1* 4/2014 Osswald ........... H02J 7/007182
320/134
2015/0069829 A1* 3/2015 Dulle ................ H01M 10/6551
307/9.1
(Continued)

FOREIGN PATENT DOCUMENTS

EP 3182552 6/2017
WO WO-2013/142964 10/2013

OTHER PUBLICATIONS

International Search Report and Written Opinion for International Patent Application No. PCT/GB2018/051896, dated Sep. 17, 2018 (10 pages).

*Primary Examiner* — Mohammed Alam
(74) *Attorney, Agent, or Firm* — Mintz Levin Cohn Ferris Glovsky and Popeo, P.C.

(57) ABSTRACT

A battery management system (103) for a battery (100) comprising a plurality of battery cells (101, 102) connected in parallel with each other. The battery management system comprises an electronic circuit (104) for connection across at least one of the plurality of battery cells. The electronic circuit comprises a charge storage device (105) and a switching device (106). The switching device switches the circuit between a first state in which charge is discharged from the at least one battery cell and directed to the charge storage device and a second state in which charge is discharged from the charge storage device and directed to the at least one battery cell. The switching device is arranged to repeatedly switch the circuit between the first state and the second state to cause the at least one battery cell to undergo pulsed charging and discharging to and from the charge storage device.

19 Claims, 5 Drawing Sheets (51) Int. Cl.
*H01M 10/42* (2006.01)
*H01M 10/44* (2006.01)
*H01M 10/46* (2006.01)
*H01M 10/48* (2006.01)
*H02J 7/34* (2006.01)

(52) U.S. Cl.
CPC ..... *H01M 10/4207* (2013.01); *H01M 10/441* (2013.01); *H01M 10/46* (2013.01); *H01M 10/482* (2013.01); *H02J 7/0047* (2013.01); *H02J 7/345* (2013.01); *H01M 2010/4271* (2013.01); *H02J 2207/20* (2020.01)

(56) References Cited

U.S. PATENT DOCUMENTS

| | | | |
|---|---|---|---|
| 2016/0187431 A1* | 6/2016 | Yamamoto | H01M 10/4285 324/426 |
| 2020/0119563 A1* | 4/2020 | Hale | H01M 10/4207 |
| 2020/0280203 A1* | 9/2020 | Sherstyuk | H01M 10/441 |

\* cited by examiner

BATTERY MANAGEMENT

CROSS-REFERENCES TO RELATED APPLICATIONS

This application is a U.S. National Phase Application of PCT International Application No. PCT/GB2018/051896, filed on Jul. 5, 2018, which is an International Application of and claims the benefit of priority to Great Britain Patent Application No. 1710818.4, filed on Jul. 5, 2017.

FIELD OF THE INVENTION

The present disclosure relates to apparatus and methods for use in a battery comprising a plurality of battery cells connected in parallel with each other. The apparatus and methods may find particular application in the field of batteries comprising lithium sulphur battery cells.

BACKGROUND

A typical battery cell comprises an anode, a cathode and an electrolyte disposed between the anode and cathode. The anode, cathode and electrolyte may be contained within a housing, for example, a pouch. Electrical connections, for example, connection tabs may be coupled to the housing to provide electrical connection with the anode and cathode of the cell. A typical battery comprises a plurality of battery cells. The cells may be coupled in series or in parallel, for example, by coupling the electrical connections to an electrical connector.

Rechargeable batteries typically include a plurality of rechargeable cells which are designed to undergo successive charge-discharge cycles. The use of such rechargeable cells, in particular stacks thereof (batteries), for the purposes of charging them with stored electrochemical energy for later discharge and use is gaining increasing importance in a range of applications including in automotive, marine and other vehicle applications, in domestic and uninterruptable energy supplies, and in storage of energy produced from intermittent and renewable electricity sources for demand and load levelling in domestic and grid-tied power networks.

During charging and discharging of a battery, it may be desirable for the capacity state of different battery cells, which form a battery to remain approximately the same as each other. That is, it may be desirable for the state of charge (or equivalently the degree of discharge) of different cells in a battery to increase and decrease in unison during charging and discharging. For example, a battery cell may be charged until each of the cells which form the battery cell reach a given state of charge. If the state of charge of each of the cells remains substantially the same as each other, then each cell may reach the given state of charge (at which charging is stopped) approximately simultaneously.

Such operation of a battery may reduce performance degradation of one or more of the cells in a battery, which might otherwise result from differences in the state of charge of different cells which form a battery.

In some batteries (for example, batteries comprising lithium-ion cells), battery cells which are connected in parallel with each other exhibit voltage characteristics which typically act to self-balance each other such that any differences in capacity state between the battery cells are corrected for. However, other battery cells, such as lithium sulphur battery cells, exhibit voltage characteristics which (in at least some situations) do not act to promote self-balancing between cells connected in parallel with each. It is therefore desirable to provide apparatus and methods which promote the reduction of capacity state differences which may arise between cells which are connected in parallel with each other.

A particular type of battery cell which is contemplated herein is a lithium sulphur (Li—S) battery cell. Lithium sulphur is a next generation cell chemistry that, having a theoretical energy density 5 times greater than, for example, lithium ion, and may better serve as an electrochemical energy store for a range of applications. A typical lithium-sulphur cell comprises an anode formed from lithium metal or a lithium metal alloy, and a cathode formed from elemental sulphur or other electroactive sulphur material. The sulphur or other electroactive sulphur-containing material may be mixed with an electrically conductive material, such as carbon, to improve its electrical conductivity.

SUMMARY OF THE INVENTION

As was alluded to above, in some battery cells the voltage across a battery cell is dependent on the state of charge of the battery cell. For example, the voltage across the battery cell may be approximately proportional to the capacity state of the battery cell. When such battery cells are connected in parallel with each other, the battery cells typically self-balance each other such that any differences in capacity between the battery cells are corrected and each battery cell has approximately the same capacity. For example, if two cells connected in parallel with each other have different capacities then the voltage across each cell may be different. Such a voltage difference will drive a current to flow between the two battery cells so as to pass charge from the battery cell at the higher capacity to the battery cell at the lower capacity, thereby acting to correct the difference in capacity between the two cells.

However, some battery cells, such as lithium sulphur battery cells, exhibit voltage characteristics whereby the open cell voltage across the battery cell remains relatively constant across a relatively large range of different capacities. Furthermore, some battery cells, such as lithium sulphur battery cells typically settle to their open cell voltages when little or no current is drawn from the battery cells. That is, when the battery cells are not being actively charged, or discharged to a load, the voltage across the battery cell falls to its open cell voltage. When such battery cells are connected in parallel with each other there may therefore be little or no voltage difference between different cells at different capacities and thus little or no current is driven to flow between the cells so as to correct any capacity difference.

It has been found that through pulsed charging and discharging of battery cells connected in parallel with each other, capacity differences between different cells can be reduced even when the open cell voltage characteristics of the battery cells do not typically drive self-balancing of the battery cell capacities.

According to a first aspect of the invention there is provided a battery management system for a battery comprising a plurality of battery cells connected in parallel with each other, the battery management system comprising: an electronic circuit for connection across at least one of the plurality of battery cells, the electronic circuit comprising: a charge storage device configured to store charge discharged from the at least one battery cell; and a switching device operable to switch the circuit between a first state in which charge is discharged from the at least one battery cell and directed to the charge storage device for charging of the charge storage device and a second state in which charge is discharged from the charge storage device and directed to the at least one battery cell for charging of the at least one battery cell; and wherein the switching device is arranged to repeatedly switch the circuit between the first state and the second state so as to cause the at least one battery cell to undergo pulsed charging and discharging to and from the charge storage device.

Switching the at least one battery cell between the first state in which charge is being drawn from the at least one battery cell and the second state in which charge is being directed into the at least one battery cell ensures that a current is flowing to and from the at least one battery cell. When a current flows to or from a battery cell, the voltage across the battery cell may be referred to as the cell's operating voltage, which is dependent on the internal resistance of the battery cell. The internal resistance of a battery cell is dependent on the capacity of the battery cell and as such, the operating voltage of a battery cell is dependent on the capacity of the battery cell. Causing battery cells to adopt their operating voltages (through pulsed discharging and charging of the battery cells) therefore results in voltage differences between cells having different capacity states. Such voltage differences act to drive balancing currents to flow between the battery cells. The balancing currents act to pass charge from a cell having a higher capacity to a cell having a lower capacity so as to reduce any capacity differences between different cells. Pulsed charging and discharging of one or more battery cells connected in parallel with each other therefore advantageously causes any differences in capacity states between different cells to be reduced.

To put it another way, parallel cells at different states of charge may have different internal resistances caused by a dependence of the internal resistance on the state of charge or capacity of a cell. During discharge of the parallel cells to the charge storage device, the difference in internal resistance between the cells (and resulting difference in voltage of the cells) causes a parallel cell at a relatively higher state of charge to deliver more current to the charge storage device than a parallel cell at a relatively lower state of charge. Similarly, during charging of the parallel cells from the charge storage device, a parallel cell at a relatively higher state of charge will receive a lower charging current than a parallel cell at a relatively lower state of charge. Consequently, a difference in state of charge of the parallel cells is reduced during pulsed discharging and charging to and from the charge storage device.

Charge which is drawn from the at least one battery cell is temporarily stored in the charge storage device before being discharged from the charge storage device back into the at least one battery cell. Such a mechanism may be relatively energy efficient. For example, an energy efficiency in excess of approximately 95% may be achieved when moving charge to and from the at least one battery cell in this manner.

In some embodiments the electronic circuit may be suitable for connection across a plurality of parallel cells. In such embodiments a plurality of parallel cells may be discharged to the charge storage device and charged from the charge storage device.

In other embodiments the electronic circuit may be suitable for connection across one battery cell of a plurality of battery cells connected in parallel with each other. In such embodiments a single cell is discharged to the charge storage device and charged from the charge storage device.

In some embodiments a plurality of electronic circuits of the type described above may be provided, where each of the electronic circuits is suitable for connection across different one or more battery cells. For example, a first electronic circuit may be connected across a first battery cell and a second electronic circuit may be connected across a second battery cell, which is connected in parallel with the first battery cell. The first and second battery cells may therefore undergo pulsed charging and discharging to and from different charge storage devices which form part of the first and second circuits respectively.

The at least one battery cell from which charge is discharged in the first state may be the same as the at least one battery cell to which charge is directed for charging in the second state. That is, charge is drawn from one or more battery cells connected in parallel with each other in the first state and is directed back to the same one or more battery cells for charging of the one or more battery cells in the second state. In embodiments in which the at least one battery cell comprises a plurality of battery cells connected in parallel, the plurality of cells which are discharged to the charge storage device in the first state are the same plurality (i.e. the same number of cells and the same group of cells) of cells which are charged from the charge storage device in the second state. In embodiments in which the at least one battery cell comprises a single battery cell (which is connected in parallel with at least one other cell), the single cell which is discharged to the charge storage device in the first state is the same cell which is charged from the charge storage device in the second state.

Put another way, in at least some embodiments, no cells which are not discharged to the charge storage device in the first state are charged from the charge storage device in the second state. Similarly, no cells which are not charged from the charge storage device in the second state are discharged to the charge storage device in the first state.

The battery management system may be configured to cause the switching device to switch the circuit between the first state and the second state when at least two of the plurality of battery cells connected in parallel with each other have different states of charge or capacities.

The switching device may be arranged to repeatedly switch the circuit between the first state and the second state so as to cause the at least one battery cell to undergo pulsed charging and discharging to and from the charge storage device such that a difference in state of charge or capacity between at least two of the plurality of battery cells connected in parallel with each other is reduced.

The circuit may be configured to repeatedly switch the circuit between the first state and the second state when the battery is in an idle state. The idle state may be a state in which the battery is not connected across an external device for charging or discharging. That is, the battery is not actively charging or discharging to or from an external device in the idle state. The idle state is a state in which the magnitude of an electrical current flowing to or from the battery through an external connection is less than a threshold current.

The threshold current may, for example, correspond to a current which flows to or from the battery through an external connection when the battery is being charged or discharged at a rate of approximately 0.01 C. The charge/discharge rate which corresponds to the threshold current may, in general, be less than about 0.05 C, may be less than about 0.03 C or may even be about 0.01 C or less.

The pulsed charging and discharging may be carried out during a time when little or no current flows between the battery and any external devices. For example, the pulsed charging and discharging may be carried out at times when the battery is not being charged from a power source and is not discharging to an external load. The pulsed charging and discharging may also be carried out during a time when a low level of charging current is flowing to the battery or a low level discharging current is flowing from the battery to an external load. Such states of the battery are considered to be examples of an idle state of the battery.

In general an idle state is any state during which the magnitude of a current flowing to or from the battery through an external connection is less than a threshold current. For example, during an idle state the magnitude of the current flowing to or from the battery may be substantially zero. Such a state may be referred to as a storage state of the battery. The storage state is considered to be an example of an idle state.

Since during an idle state of the battery, little or no current is flowing between the battery and any external devices, the voltages across the battery cells may relax to their open cell voltages. The open cell voltages of different battery cells at different capacities may be approximately the same and as such there may be little or no voltage difference between cells having different capacities. During such a time it is therefore particularly advantageous to provide pulsed charging and discharging to and from the storage device so as to bring the voltages across the at least one battery cell to their operating voltages and promote self-balancing currents to flow between cells at different capacity states.

During an idle state of a battery, some battery cells (e.g. lithium sulphur cells) may experience self-discharge over time. Such self-discharge may occur at slightly varying rates for different cells and may cause capacity differences to develop between different cells during an idle state. It is therefore particularly advantageous to provide pulsed charging and discharging whilst the battery is in an idle state so as to reduce any capacity differences which might otherwise develop during the idle state.

The battery management system may further comprise a controller operable to switch between a first mode in which the switching device repeatedly switches the circuit between the first state and the second state and a second mode in which the switching device does not switch the circuit between the first state and the second state.

It may be advantageous to only perform pulsed charging and discharging to and from the charge storage device at given times. For example, as was described above it may be advantageous to perform pulsed charging and discharging to and from the storage device when the battery is in an idle state. However, at other times it may be preferable not to perform pulsed charging and discharging to and from the storage device. For example, at times when a substantial charging or discharging current is flowing to or from the battery through an external connection, it may be preferable not to also perform pulsed charging and discharging to and from the charge storage device. The controller is therefore operable to switch between the first mode and the second mode so as to selectively alternate between carrying out pulsed charging and discharging and not carrying out the pulsed charging and discharging.

Furthermore, during an idle state of a battery, pulsed charging and discharging to and from the charge storage device may not be required at all times. For example, it may be more energy efficient to occasionally switch the controller to the second mode during which no charging/discharging is carried out, rather than leaving the controller in the first mode at all times during the idle state.

The controller may be configured to periodically switch between the first mode and the second mode when the battery is in the idle state.

The controller may be configured to switch to the first mode on a periodic basis when in an idle state so as to correct any capacity differences between cells, which may have developed in between the times at which the controller is in the first mode. The controller may be configured to be in the first mode for a given portion of time. For example, the controller may switch to the first mode for approximately an hour during every 24 hour time period. In such an embodiment, an hour of pulsed charging and discharging of the battery cells may be sufficient to correct any capacity differences which may have developed between the battery cells during the 24 hour period between the controller last having been switched to the first mode.

The controller may be configured to determine that the battery is in an idle state.

The battery management system may monitor one or more properties of the battery to determine that the battery is in the idle state. For example, if any current flowing between the battery and any external devices falls below a threshold current level then this may indicate that the battery is in the idle state. As was explained above, the controller may carry out pulsed charging and discharging to and from the charge storage device when it is determined that the battery is in the idle state.

The battery management system may further comprise a current monitoring device configured to measure an electrical current flowing to or from the battery through an external connection.

The battery management system may be configured to determine that the battery is in the idle state when the measured electrical current falls below a threshold current.

The threshold current may, for example, correspond to a current which flows to or from the battery through an external connection when the battery is being charged or discharged at a rate of approximately 0.01 C. The charge/discharge rate which corresponds to the threshold current may, in general, be less than about 0.05 C, may be less than about 0.03 C or may even be about 0.01 C or less.

The controller may be configured to determine when to switch between the first and second modes based upon the measured electrical current flowing to or from the battery through an external connection.

For example, interval periods between which the controller switching to the first mode may be varied depending on the magnitude of an electrical current to or from the battery through an external connection. For instance, the time period between switching to the first mode may be greater when there is some current flowing to or from the battery through an external connection than when substantially no current is flowing to or from the battery. When there is some current flowing to or from the battery through an external connection some self-balancing between parallel cells may occur. It may therefore take longer for significant capacity differences to develop between parallel cells than if substantially no current is flowing to or from the battery. The period between performing capacity balancing between the cells by switching to the first mode may therefore be increased, relative to a situation in which substantially no current is flowing to or from the battery.

The switching device may be configured to cause the at least one battery cell to undergo pulsed charging and discharging to and from the charge storage device at a frequency of greater than about 0.5 Hertz.

The switching device may be configured to cause the at least one battery cell to undergo pulsed charging and discharging to and from the charge storage device at a frequency of less than about 10 Hertz.

The electronic circuit may comprise a DC to DC converter circuit.

The charge storage device may comprise at least one capacitor.

The charge storage device may comprise a first capacitor and the electronic circuit further comprises a second capacitor, and wherein the switching device is operable to switch the circuit between the first state in which the first capacitor is connected to draw current from the at least one battery cell and charge the first capacitor and the second state in which the first capacitor and the second capacitor are connected in series with each other so as to supply current to the at least one battery cell.

When the circuit is in the first state current is drawn from the at least one battery cell to charge the first capacitor. Charge is therefore stored in the first capacitor which can later be discharged back to the at least one battery cell when the circuit is switched to the second state. In the second state the first and second capacitors are connected in series with each other so as to combine their voltages and drive current from the capacitors to the at least one battery cell. The second capacitor may be pre-charged, for example, from the at least one battery cell and may act to boost the voltage across the capacitors when connected in series, so as to drive current form the capacitors and to the at least one battery cell so as to charge the at least one battery cell.

The capacitance of the second capacitor may be at least 10 times greater than the capacitance of the first capacitor.

In some embodiments, the capacitance of the second capacitor is much greater than 10 times the capacitance of the first capacitor. For example, the capacitance of the second capacitor may be greater than about 20 times, greater than about 40 times, greater than about 60 times or greater than about 80 times or more of the capacitance of the first capacitor. The capacitance of the second capacitor may, for example, be up to about 100 times greater than the capacitance of the first capacitor.

The switching device may be operable to switch the circuit to a third state in which the second capacitor is connected to draw current from the at least one battery cell so as to charge the second capacitor.

In the third state, the second capacitor is charged by the at least one battery cell. As was explained above, the capacitance of the second capacitor may be many times the capacitance of the first capacitor, and the second capacitor may predominantly act to boost the voltage of the capacitors when connected in series so as to drive current to flow from the capacitors and to the at least one battery cell. Prior to repeatedly switching the circuit between the first and second states so as to perform pulsed charging and discharging of the at least one battery cell, the second capacitor may be pre-charged to close to its fully charged state. The second capacitor may be pre-charged, for example, by switching the circuit to the third state. Additionally or alternatively, the circuit may be periodically switched to the third state so as to recharge the second capacitor, after it has been discharged during repetitive switching between the first and second states.

The battery management system may further comprise a controller configured to control the switching device to interrupt the repeated switching of the circuit between the first and second states and to switch the circuit to the third state so as to charge the second capacitor from the at least one battery cell.

When the capacitors are connected in series (by switching the circuit to the second state) so as to drive a charging current to the at least one battery cell, the first capacitor may be discharged to a greater extent than the second capacitor (due to its smaller capacitance). The second capacitor may therefore be discharged much more slowly than the first capacitor during repeated switching of the circuit between the first and second states (so as to deliver pulsed charging and discharging to the at least one battery cell). The second capacitor may therefore be used through multiple successive cycles of switching between the first and second states without the second capacitor becoming significantly discharged. The first capacitor, on the other hand, is charged and discharged during each cycle of switching between the first and second states. However, the second capacitor will still be slowly discharged during repeated switching between the first and second states, and may periodically need be recharged. The second capacitor may be recharged by switching the circuit to the third state so as to draw current from the at least one battery cell to recharge the second capacitor.

According to a second aspect of the invention there is provided a battery comprising a plurality of battery cells connected in parallel with each other and a battery management system of any preceding claim.

The plurality of battery cells may be lithium sulphur battery cells.

According to a third aspect of the invention there is provided a method for controlling a battery comprising a plurality of battery cells connected in parallel with each other, the method comprising: repeatedly switching an electronic circuit connected across at least one of a plurality of battery cells between a first state and a second state, wherein in the first state charge is discharged from the at least one battery cell and directed to a charge storage device for charging of the charge storage device and in the second state charge is discharged from the charge storage device and directed to the at least one battery cell for charging of the at least one battery cell; wherein the repeated switching of the circuit between the first state and the second state causes the at least one battery cell to undergo pulsed charging and discharging to and from the charge storage device.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF FIGURES

One or more embodiments of the invention are shown schematically, by way of example only, in the accompanying drawings, in which.

DETAILED DESCRIPTION

Before particular examples of the present invention are described, it is to be understood that the present disclosure is not limited to the particular battery management system, battery or method described herein. It is also to be understood that the terminology used herein is used for describing particular examples only and is not intended to limit the scope of the claims.

In describing and claiming the battery management systems, batteries and methods of the present invention, the following terminology will be used: the singular forms "a", "an", and "the" include plural forms unless the context clearly dictates otherwise. Thus, for example, reference to "a battery cell" includes reference to one or more of such elements.

Figure 1:
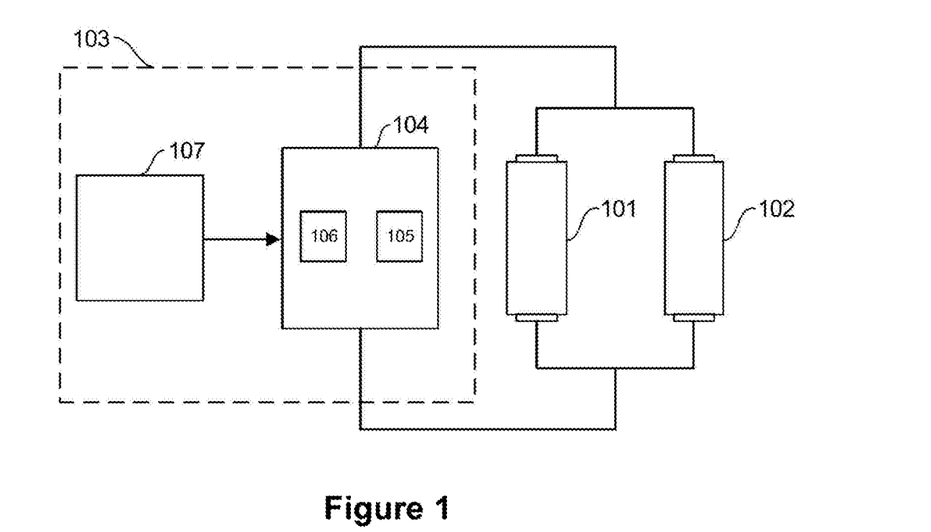
FIG. 1 is a schematic illustration of a battery according to an embodiment of the present invention.

FIG. 1 is a schematic illustration of a battery 100 according to an embodiment of the present invention. The battery 100 comprises a first battery cell 101, a second battery cell 102 and a battery management system 103. The battery management system 103 includes the components shown within the dashed box 103 in FIG. 1. The first battery cell 101 and the second battery cell 102 are connected in parallel with each other. Whilst the battery 100 which is shown in FIG. 1 comprises two cells 101, 102, in other embodiments the battery 100 may comprise more than two battery cells. In general the battery includes any arrangement of a plurality of battery cells in which at least two battery cells are connected in parallel with each other. In addition to the at least two cells which are connected in parallel with each other, the battery may include cells which are connected in series with each other. The battery cells are rechargeable battery cells.

The battery management system 103 comprises an electronic circuit 104. In the embodiment shown in FIG. 1, the battery management system 103 also comprises a controller 107. Whilst not shown in FIG. 1, the circuit 104 may be operable to establish a connection between the battery cells 101, 102 and an external device. For example, an external power source may be connected across the battery cells 101, 102 in order to deliver a charging current to the battery cells 101, 102. The circuit 104 may be operable to connect an external load across the battery cells 101, 102 so as to discharge the battery cells 101, 102 into the load. The circuit 104 may, for example, include connections between the battery cells and terminals (not shown) of the battery 100 to which an external power supply and/or an external load may be connected. The circuit may include one or more switches which may be operated in order to connect and disconnect the battery cells 101, 102 to and from the terminals of the battery 100. The circuit 104 may include circuitry or other apparatus arranged to condition charging and/or discharging currents which may flow between the battery cells 101, 102 and an external apparatus (such as a power supply and/or a load)

During the lifetime of the battery 100, the state of charge of the first and second cells 101, 102 may develop differences between them. As was mentioned above, in some battery cells (e.g. a lithium-ion cell) the open-cell voltage across a battery cell is approximately directly proportional to the capacity state of the battery cell. Different battery cells having different capacity states will therefore have different voltages across them. When such cells are connected in parallel with each other, voltage differences between the cells (caused by varying capacity states of the cells) act to drive self-balancing currents to flow between the cells so as to correct any differences in capacity. For example, if two cells connected in parallel with each other have different capacity states then the voltage across each cell will be different. Such a voltage difference will drive a current to flow between the two battery cells so as to pass charge from the battery cell at the higher capacity state to the battery cell at the lower capacity state, thereby acting to correct the difference in capacity between the two cells.

Figure 2A:
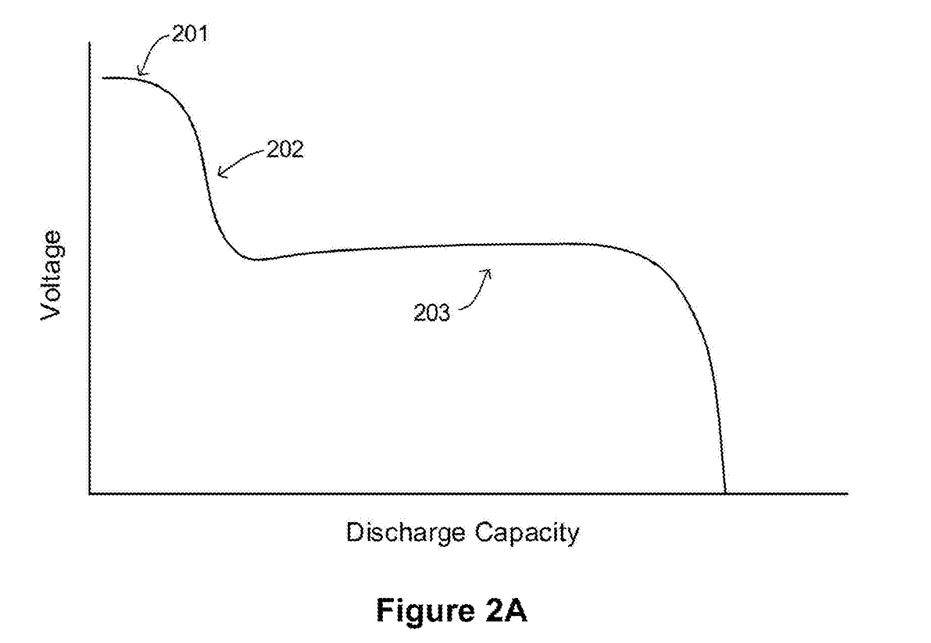
FIGS. 2A and 2B are schematic representations of the voltage of a lithium sulphur battery cell during discharge.

However, some battery cells, such as Li—S cells, exhibit voltage characteristics which do not typically act to drive self-balancing currents to flow between cells having different capacity states. FIG. 2A is a schematic representation of an operating voltage of a typical Li—S cell as a function of discharge capacity during discharge of the cell. The operating voltage is the voltage of the Li—S cell whilst a discharge current is being drawn from the cell (or equivalently whilst a charging current is being delivered to the cell). It can be seen from FIG. 2A that at relatively high states of charge the cell exhibits a short high capacity plateau region 201 during which the voltage remains relatively constant with changing capacity. After the high capacity plateau region 201, a rapid change 202 in the voltage occurs before reaching a relatively long low capacity plateau region 203 during which the voltage remains relatively constant with changing capacity. The low capacity plateau region 203 continues until the voltage drops rapidly to zero at a low state of charge.

It can be seen from FIG. 2A that in the plateau regions 201, 203 the voltage of the cell remains relatively constant over a large range of different capacities. Different cells 101, 102 which are connected in parallel with each and which have different capacity states in a plateau region 201, 203 will therefore have approximately similar voltages. There will therefore be no large voltage differences between parallel cells 101, 102, which will drive self-balancing currents to correct for the capacity difference between the parallel cells 101, 102.

Figure 2B:
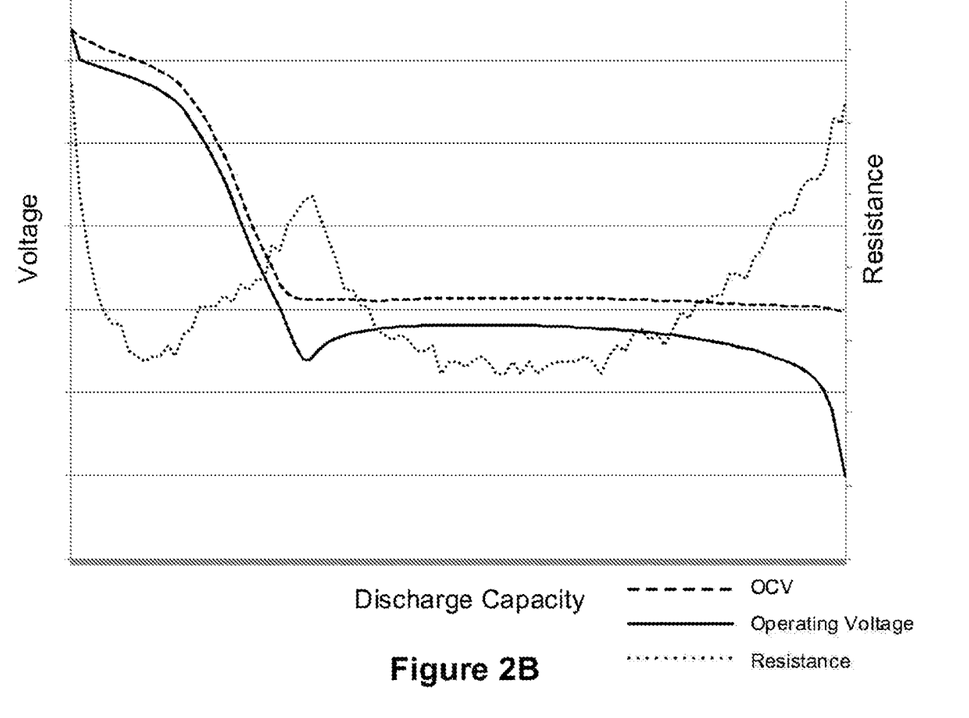

Furthermore, the voltage of a typical Li—S cell tends to settle to a nominal open cell voltage after a relatively short period of time when little or no current is drawn from the cell. FIG. 2B is a schematic representation of the operating voltage of a Li—S cell (solid line) and the open cell voltage (OCV) of the Li—S cell (dashed line). The open cell voltage (OCV) is the voltage of the cell when the cell is not connected to a load. As can been seen in FIG. 2B, the OCV of the Li—S cell is substantially constant for a large range of different states of charge. It will be appreciated that when parallel cells 101, 102 having different capacities settle to their open cell voltages there may be little or no difference between the voltages across the cells. Little or no voltage difference is therefore present to drive self-balancing currents to flow between the cells so as to correct any capacity difference between the cells 101, 102.

Also shown in FIG. 2B is the internal resistance of the Li—S cell (dotted line) as function of the discharge capacity. As can be seen in FIG. 2B the internal resistance of the cell varies as a function of the state of charge of the Li—S cell during discharge. As will be explained in further detail below, the dependence of the internal resistance of a Li—S cell on its state of charge may be used to promote balancing of the state of charge of cells connected in parallel with each other.

Some battery cells (e.g. Li—S cells) are also known to exhibit a relatively high degree of self-discharge over time. For example, over time the state of charge of the battery cells 101, 102 may decrease even when they are not connected to an external load. The rate at which the cells 101, 102 self-discharge may vary according to variations within the cells and thus the cells 101, 102 may self-discharge at different rates to each other. A difference between the state of charge of the first and second cells 101, 102 may therefore develop during self-discharge.

Figure 3:
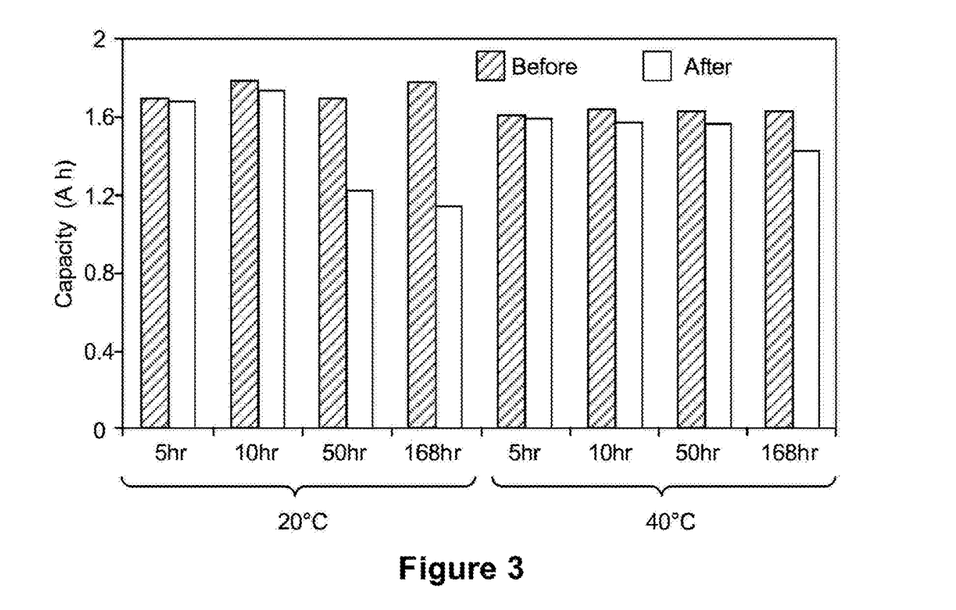
FIG. 3 is a schematic representation of the capacity of a lithium sulphur battery cell before and after different self-discharge periods.

Self-discharge may in particular occur at a relatively fast rate in lithium sulphur (Li—S) cells. For example, the state of charge of a typical Li—S cell may decrease by approximately 25% over a 48 hour time period, due to self-discharge. FIG. 3 is a schematic representation of the capacity state of Li—S cells before and after a number of different time periods in which the cells are in storage (and are not therefore connected to an external load). The capacity state is shown in Ampere hours (A h) and is shown for storage periods of 5, 10, 50 and 168 hours. The capacity states at the start of the storage periods are depicted with right-hashed filled rectangles and the capacity states at the end of the storage periods are depicted with unfilled rectangles. The four left-hand most pairs of rectangles represent cells stored under ambient conditions of 20 degrees Celsius CC). The four right-hand most pairs of rectangles represent cells stored under ambient conditions of 40° C.

It can be seen from FIG. 3 that the capacity state of a Li—S cell decreases during each of the storage periods represented in FIG. 3. Since, the cells are not connected to an external load during the represented storage periods, the fall in capacity state is due to self-discharge of the cells. It can further be seen from FIG. 3 that the degree to which a Li—S self-discharges increases with increasing storage time and is dependent on the temperature at which the cell is stored.

It will be appreciated that during storage periods of Li—S cells, which are connected in parallel with each other (e.g. the first and second cells 101, 102), different Li—S cells may self-discharge by different amounts (e.g., due to differences in characteristics of the different cells). After a period of self-discharge parallel cells 101, 102 may therefore be at different capacity states.

Figure 4A:
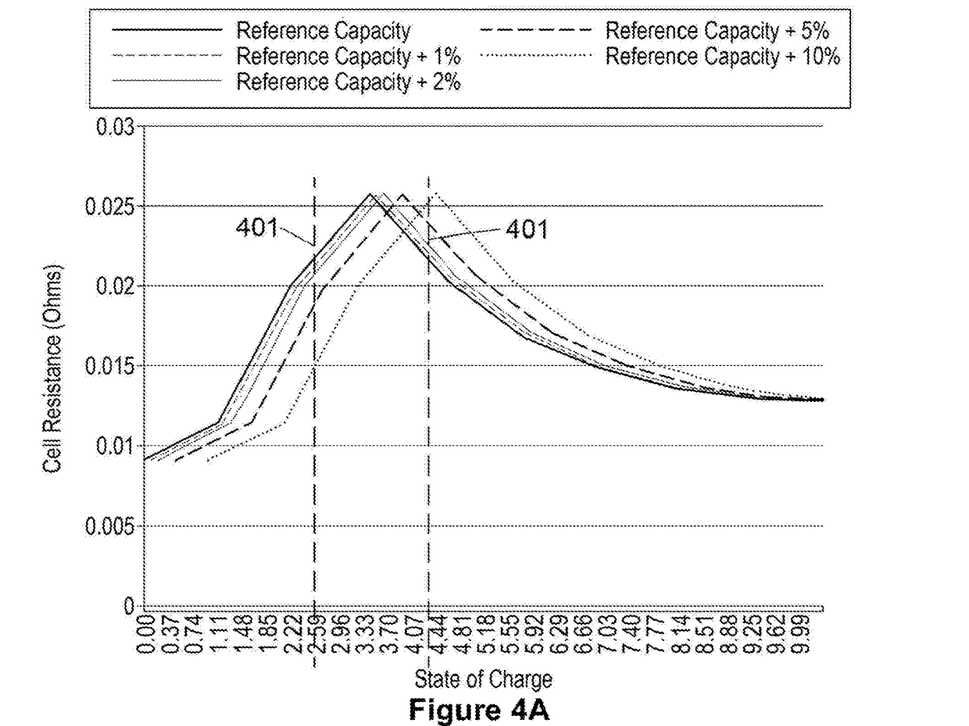
FIGS. 4A and 4B are schematic representations of the resistance of lithium sulphur battery cells during discharge and charge.
Figure 4B:
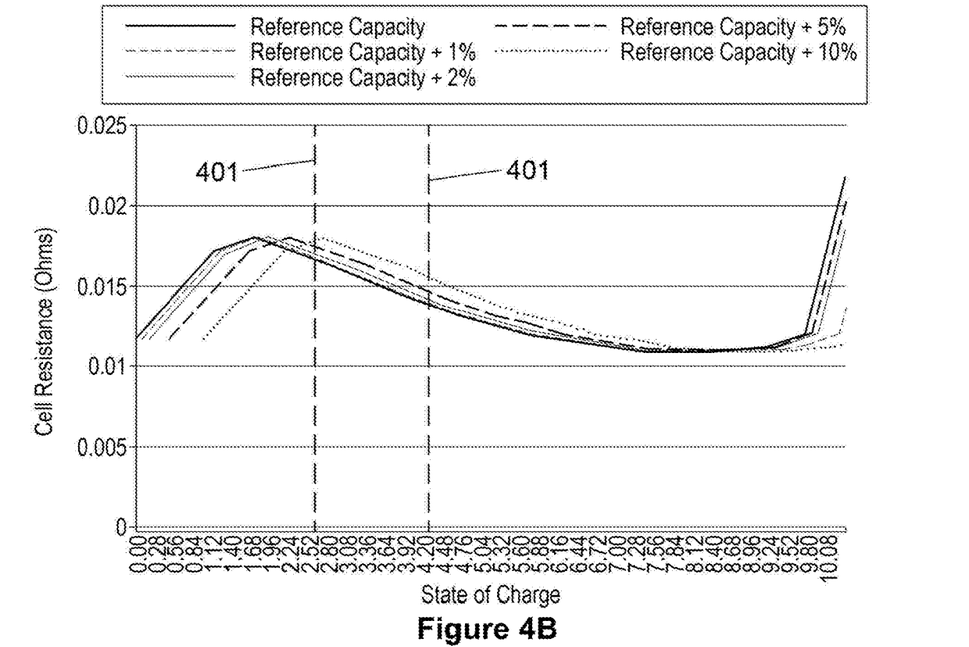

If left uncorrected, a difference in capacity state between parallel cells 101, 102 may increase during further discharge of the cells 101, 102 due to the resistance characteristics of the cells. FIG. 4A is a schematic representation of the resistance of a number of different Li—S cells during discharge, as a function of their state of charge. FIG. 4B is an equivalent representation of the resistance of different Li—S cells during charging. The different cells represented in FIGS. 4A and 4B have a spread of initial capacities of up to 10%. Solid lines in FIGS. 4A and 4B represent the resistance during discharge and charge of a cell having an initial reference capacity. The other lines shown in FIGS. 4A and 4B represent the resistance during discharge and charge of cells having initial capacities which are 1%, 2%, 5% and 10% greater than the initial reference capacity as indicated by the legend shown in FIGS. 4A and 4B.

It can be seen from FIG. 4A that during discharge of a Li—S cell, the internal resistance of the cell initially increases before reaching a peak resistance and then decreases with further discharging. It can also be seen that different cells having different initial capacities also have different resistances relative to their state of charge. When cells having different resistances are connected in parallel with each other and are connected across a load so as to discharge to the load, the cells will discharge at different rates according to their resistances. In particular, a cell having a higher resistance will discharge at a lower rate than a cell having a lower resistance.

The above described property can lead to an increasing spread in capacity of different cells connected in parallel with each other and discharging to a load. For example, referring to FIG. 4A, at a depth of discharge of approximately 30% the cell having the initial reference capacity (represented by the solid line in FIG. 4A) reaches its peak resistance and its resistance begins decreasing with further discharge. As the cell's resistance decreases, the rate at which it discharges will simultaneously increase (due to its falling resistance).

At the same time, the cell having an initial capacity of 10% greater than the reference capacity (represented by a dotted line in FIG. 4A) has a resistance which is continuing to increase towards its peak resistance. As the cell's resistance increases, the rate at which it discharges will simultaneously decrease (due to its increasing resistance).

In the situation described above, a cell having a lower capacity is discharging at a faster (and increasing) rate and a cell having a higher capacity is discharging at a slower (and decreasing) rate. The difference in capacity between the two cells will therefore increase during further discharge. This effect, in particular occurs, after a cell has reached its resistance peak during discharge, which may, for example, occur at a degree of discharge of approximately 30%.

As can be seen from FIG. 3, a cell which is stored at approximately 20° C. loses approximately 25% of its initial capacity after 50 hours and over 35% of its capacity after 168 hours (a week) due to self-discharge. Such a cell will therefore have discharged to such an extent that it will be approaching or will have passed its resistance peak.

If, for example, the first and second cells 101, 102 shown in FIG. 1 are charged to full capacity and then stored for a period of over 50 hours, the cells may self-discharge at different rates. The cells may then have different capacities and may be approaching or may have passed their resistance peaks. If the cells are subsequently connected to a load and begin discharging to the load, the difference in their capacities may increase during discharging due to differences in their resistances.

As was explained in detail above, cells which are connected in parallel with each other (such as the first and second cells 101, 102 shown in FIG. 1) may develop capacity differences between them which may not typically correct themselves and which may be increased during use (e.g. during discharging to a load). It is therefore desirable to provide methods and apparatus for correcting capacity differences which may develop between parallel cells.

It has been found that through pulsed charging and discharging of battery cells connected in parallel with each other, capacity differences between different cells can be reduced even when the open cell voltage characteristics of the battery cells do not typically drive self-balancing of the battery cell capacities. Referring again to FIG. 1, the circuit 104, which forms part of the battery management system 103, is operable to deliver pulsed charging and discharging of the cells 101, 102 to and from a storage device, which forms part of the circuit 104.

In general, the circuit 104 comprises a charge storage device 105 and a switching device 106 as is illustrated schematically in FIG. 1. The charge storage device 105 is configured to store charge which is discharged from the cells 101, 102. The switching device 106 is operable to switch the circuit 104 between a first state and a second state. In the first state, charge is discharged from the cells 101, 102 and directed to the charge storage device 105 for charging of the charge storage device 105. In the second state, charge is discharged from the charge storage device 105 and directed to the cells 101, 102 for charging of the cells 101, 102. The switching device 106 is operable to repeatedly switch the circuit between the first state and the second state so as to cause the cells 101, 102 to undergo pulsed charging and discharging to and from the charge storage device 105.

Charge which is drawn from the cells 101, 102 is temporarily stored in the charge storage device 105 before being discharged from the charge storage device 105 back into the cells 101, 102. Such a mechanism may be relatively energy efficient. For example, an energy efficiency in excess of approximately 95% may be achieved when moving charge to and from the cells 101, 102 in this manner. The cells 101, 102 which are discharged to the charge storage device 105 are the same cells 101, 102 which are subsequently charged from the charge storage device 105. That is, the circuit 104 is arranged to transfer charge to and from the same one or more cells 101, 102 and the charge storage device 105. In at least some embodiments, no cells which are not discharged to the charge storage device 105 in the first state are charged from the charge storage device 105 in the second state. Similarly, no cells which are not charged from the charge storage device 105 in the second state are discharged to the charge storage device 105 in the first state.

Switching the cells 101, 102 between the first state, in which charge is being drawn from the battery cells and the second state, in which charge is being directed to the cells 101, 102 causes currents to flow to and from the battery cells 101, 102. When a current flows to or from the cells 101, 102 the voltage across the cells 101, 102 adopts the cell's operating voltages, which are dependent on the internal resistance of the cells. As was alluded to above (and as illustrated in FIGS. 2B, 4A and 4B), the internal resistance of a cell is dependent on the capacity state of the cell. Causing the battery cells 101, 102 to adopt theft operating voltages, by repeatedly drawing current from the battery cells 101, 102 to the storage device 105 and drawing current from the storage device 105 to the cells 101, 102, therefore results in a voltage difference between the cells 101, 102, if the cells 101, 102 have different capacity states.

Figure 5:
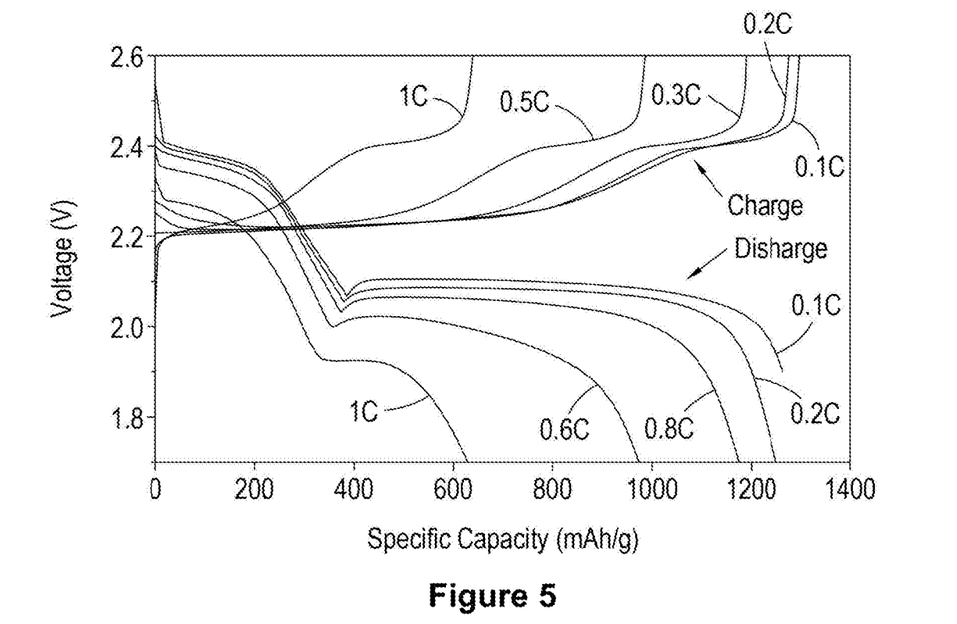
FIG. 5 is a schematic representation of the operating voltage of a lithium sulphur battery cell during discharge and charge.

FIG. 5 is a schematic representation of the operating voltage of a Li—S cell as a function of specific capacity during charging and discharging at a number of different charge and discharge rates. It can be seen from FIG. 5 that the operating voltage of a Li—S cell becomes strongly dependent on capacity during charge and discharge, particularly for higher charge and discharge rates (e.g. 0.6 C and 1 C). During charge and discharge of Li—S cells, different cells at different capacity states will therefore have different voltages across them. When such cells are connected in parallel (such as the cells 101, 102) and are at different capacity states a voltage difference will therefore exist between the cells during charging and discharging.

It will be appreciated that such a voltage difference between cells which are connected in parallel, will act to drive a current to flow between the cells 101, 102. In particular, a current will flow from a cell having a higher capacity to a cell having a lower capacity. Such a current may be referred to as a balancing current. A balancing current acts to reduce a capacity difference between the cells 101, 102 by transferring charge from a cell having a higher capacity state to a cell having a lower capacity state. Switching the circuit 104 between the first state and the second state so as to cause pulsed charging and discharging of the cells 101, 102 therefore advantageously acts to reduce any capacity differences between the cells 101, 102.

Figure 6:
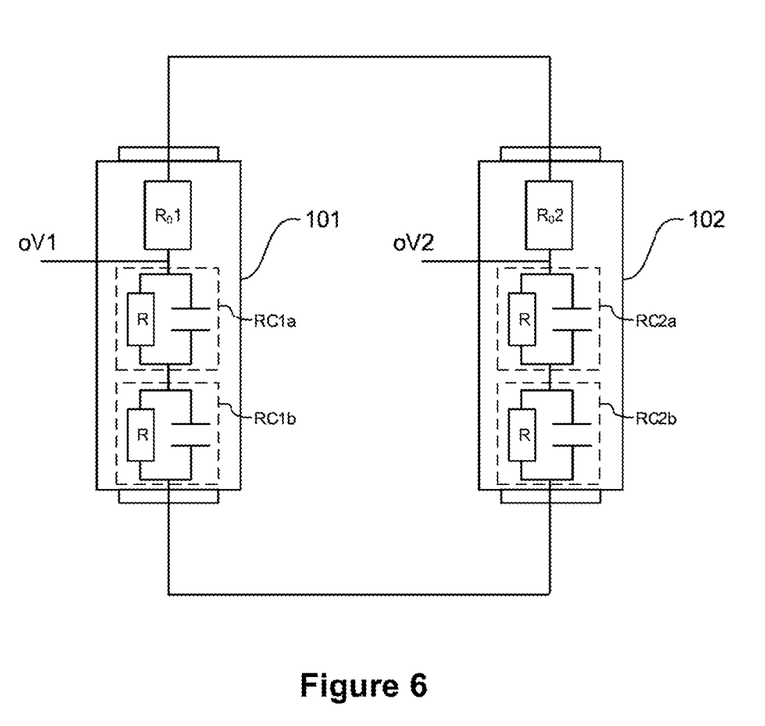
FIG. 6 is a schematic representation of an equivalent circuit diagram of two battery cells connected in parallel.

In order to further assist in understanding the invention, an equivalent circuit diagram of two parallel cells 101, 102 is shown schematically in FIG. 6. Each cell 101, 102 has an internal resistance which is equivalent to a series combination of a purely Ohmic resistance $R_o1$, $R_o2$ and diffusion/transient loss components $RC1a$, $RC1b$, $RC2a$ and $RC2b$ of the resistance. As shown in FIG. 6, each diffusion/transient loss resistance component $RC1a$, $RC1b$, $RC2a$, $RC2b$ is equivalent to a purely Ohmic resistance in parallel with a capacitance. Also shown in FIG. 6 are operating voltage $oV1$ and $oV2$ of the cells 101, 102. It will be appreciated that in practice, the cells 101, 102 do not include the electrical components shown in FIG. 6. FIG. 6 merely provides an equivalent circuit diagram which can be used to explain the electrical behaviour of the cells 101, 102.

Applying pulsed charging and discharging to the cells 101, 102 acts to the bring the operating voltages $oV1$, $oV2$ of the cells closer together and may eventually lead to balancing of the operation voltages $oV1$, $oV2$. As was explained above, cells which are at different states of charge may have different internal resistances. For example, if the first cell 101 is at a higher state of charge than the second cell 102 then the internal resistances of the cells 101, 102 may differ. In particular, the Ohmic components $R_o1$ and $R_o2$ may be different and/or the diffusion/transient loss components $RC1a$, $RC1b$ and $RC2a$, $RC2b$ may be different.

Differences in resistance of the cells will result in different amounts of charge being discharged from the cells 101, 102 to the charge storage device during a discharge pulse and different amounts of charge being received by the cells 101, 102 during a charge pulse. For example, if the first cell 101 is at a higher state of charge than the second cell 102, then the cells 101, 102 will have different internal resistances and the operating voltages $oV1$, $oV2$ associated with the cells will be different. During a discharge pulse when the cells 101, 102 are discharged to the charge storage device 105, the differences in internal resistance between the two cells 101, 102 causes the first cell 101 to discharge a higher current to the charge storage device 105 than the second cell 102. Similarly, during a charge pulse when the cells 101, 102 are charged from the charge storage device 105, the difference in internal resistance between the two cells 101, 102 and a proportional difference between the internal resistance for a given state of charge during charge to that of discharge, causes the first cell 101 to receive a smaller charging current than it gave up during discharge and the second cell 102 to receive a greater charge current than it gave up during discharge. Pulsed charging and discharging of the cells to/from the charge storage device 105 therefore acts to reduce a difference in state of charge between the parallel cells 101, 102 and also to reduce a difference in the operating voltages $oV1$, $oV2$. If the cells 101, 102 are repeatedly charged and discharge to/from the charge storage device 105 then the state of charge of the cells and the operating voltages oV1, oV2 may become substantially the same.

Advantageous balancing currents may in particular be promoted at states of charge which lie within dashed lines labelled 401 in FIGS. 4A and 4B. At states of charge which fall within the region bounded by the lines 401, during a discharge pulse the resistance increases with decreasing capacity and during a charging pulse the resistance decreases with decreasing capacity. Such conditions may advantageously promote balancing currents to flow from a cell at a higher capacity state to a cell at a lower capacity state. It may therefore be particularly advantageous to perform pulsed charging and discharging of the cells 101, 102 at the states of charge indicated in FIGS. 4A and 4B. Such pulsed charging and discharging may advantageously reduce capacity differences between parallel cells before a resistance peak of the cells is reached. As was explained above, further discharging of a parallel cell after one of the cells has reached their resistance peak, may result in capacity differences between the cells further increasing. It may therefore be desirable to reduce any capacity differences between parallel cells before one of the cells reaches their resistance peak.

Figure 7:
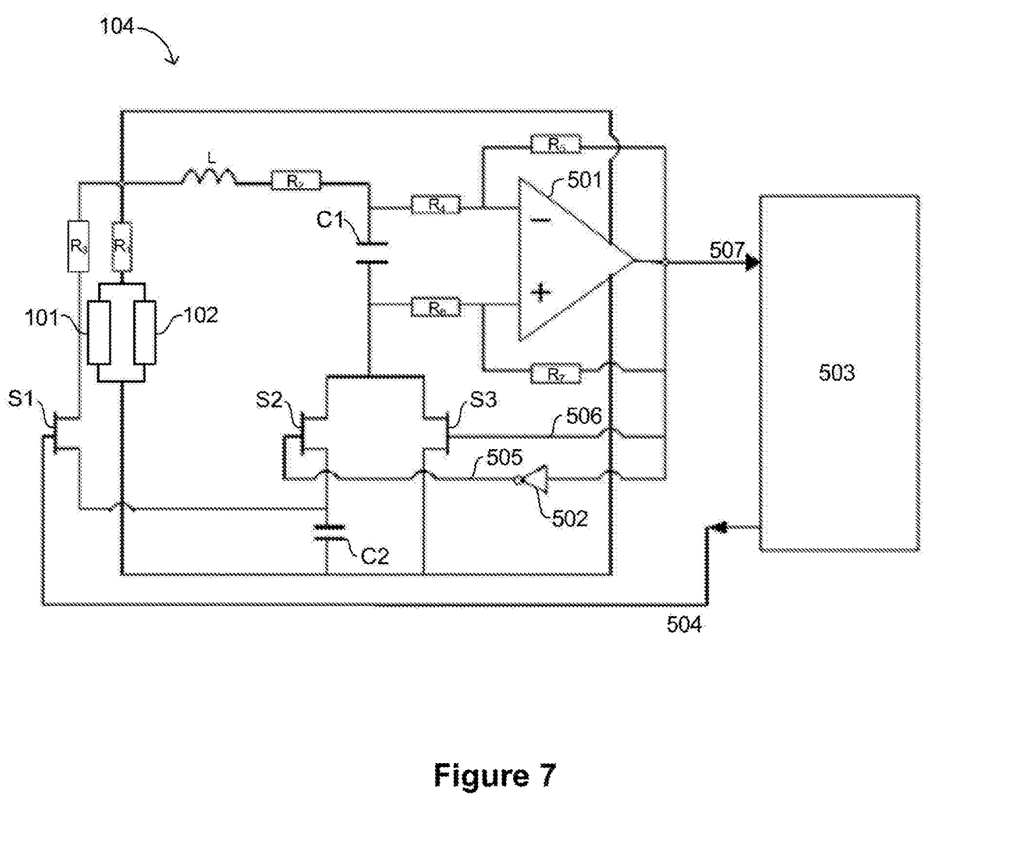
FIG. 7 is a schematic illustration of a circuit which may form part of the battery of FIG. 1.

FIG. 7 is a schematic illustration of an embodiment of the circuit 104 of FIG. 1. The circuit 104 is connected across a first cell 101 and a second cell 102, which are themselves connected in parallel with each other. The circuit 104 is a DC-DC converter circuit arranged to transfer charge from the cells 101, 102 to a storage device and to transfer charge back from the storage device to the cells 101, 102. In the embodiment of FIG. 7, the storage device comprises a first capacitor C1.

The circuit 104 comprises a first capacitor C1, a second capacitor C2, a first switch S1, a second switch S2, a third switch S3, a plurality of resistors $R_1$—$R_7$, an inductor L, an operational amplifier (op-amp) 501 and an inverter 502. The capacitance of the second capacitor C2 is greater than the capacitance of the first capacitor C1. In some embodiments, the capacitance of the second capacitor C2 is many times greater than the capacitance of the first capacitor C2. For example, the capacitance of the second capacitor C2 may be about 10 times greater or more than the capacitance of the first capacitor C1 In some embodiments, the capacitance of the second capacitor C2 may be greater than about 20 times, greater than about 40 times, greater than about 60 times or even greater than about 80 times or more of the capacitance of the first capacitor C1. The capacitance of the second capacitor may, in some embodiments, be up to about 100 times greater than the capacitance of the first capacitor C1.

The second capacitor C2 may be pre-charged in advance of providing pulsed charging and discharging of the cells 101, 102. For example, the second capacitor C2 may be pre-charged from the cells 101, 102 by dosing the first switch S1 such that the second capacitor C2 is connected across the cells 101, 102. The first switch S1 is controlled by a controller 503 which outputs a first switching signal 504 to the first switch S1. The controller 503, which is shown in FIG. 7 may be the same component as the controller 107, which is shown in FIG. 1 or may be a different component. The state of the first switch S1 is dependent on the first switching signal 504. The first switch S1 may, for example, be a transistor, Once the second capacitor C2 is pre-charged from the cells 101, 102 the controller 503 may control the first switch S1 so as to open the first switch S1.

Pulsed charging and discharging of the cells 101, 102 may be performed by repeated opening and closing of the second switch S2 and the third switch S3. The second S2 and third S3 switches operate in response to second 505 and third 506 switching signals respectively. The third switching signal 506 corresponds with the output of the op-amp 501. The second switching signal 505 corresponds with the inverse of the output of the op-amp 501, since it has passed through the inverter 502. The second switching signal 505 therefore corresponds to the inverse of the third switching signal 506. The second S2 and third S3 switches are in general therefore opened and closed in opposition to each other. That is, when the second switch S2 is open the third switch S3 is closed and when the second switch S2 is closed the third switch S3 is open. The second switch S2 and the third switch S3 may, for example, be transistors.

The first state of the circuit 104, which was referred to above, corresponds to a state in which the second switch S2 is open and the third switch S3 is closed. In the first state, the first capacitor C1 is connected across the first and second cells 101, 102 such that current flows from the cells 101, 102 to the first capacitor C1 in order to charge the first capacitor C1.

The second state of the circuit 104, which was also referred to above, corresponds to a state in which the second switch S2 is closed and the third switch S3 is open. In the second state the first capacitor C1 and the second capacitor C2 are connected in series with each other and are connected in series with the cells 101, 102. Since the second capacitor C2 has been pre-charged and has a relatively high capacitance, the series voltage of the first and second capacitors C1, C2 is sufficient to drive a charging current from the capacitors C1, C2 to the cells 101, 102 so as to charge the cells 101, 102.

It will be appreciated that since the second capacitor C2 has a much larger capacitance than the first capacitor C1 (and has been pre-charged) the state of charge of the second capacitor C2 decreases more slowly than the state of charge of the first capacitor C1 when the circuit 104 is in the second state. The first capacitor C1 therefore reaches a state of relative discharge when the circuit is in the second state and is recharged from the cells 101, 102 on each occasion that the circuit is switched from the second state to the first state. In contrast the second capacitor C2 may be able to undergo many repetitions of switching between the first and second states without being recharged. The second capacitor C2 effectively acts to boost the voltage of the capacitors C1 and C2 when connected in series so as to drive a charging current to the cells 101, 102.

Whilst the second capacitor C2 may be able to undergo many repetitions of switching between the first and second states without being recharged, it is still discharged to an extent when the circuit 104 is in the second state and may therefore require periodic recharging. The second capacitor C2 may be recharged by closing the first switch S1 (e.g. under control of the controller 503) so as to connect the second capacitor C2 across the cells 101, 102 and charge the second capacitor C2 from the cells 101, 102. A state of the circuit 104 in which the first switch S1 is closed may be referred to as a third state of the circuit 104. In general, the third state of the circuit 104 is a state in which the second capacitor C2 is connected to draw current from the cells 101, 102 so as to charge the second capacitor C2.

As was described above, the second 505 and third 506 switching signals are dependent on the output of the op-amp 501. As depicted in FIG. 7, inputs to the op-amp 501 are taken from either side of the first capacitor C1. The output of the op-amp 501 is therefore dependent on the voltage across the first capacitor C1, which is itself dependent on the state of charge of the first capacitor C1. In the embodiment of FIG. 7, the cells 101, 102 are connected to act as a power supply to the op-amp 501.

The op-amp 501 and the resistors $R_4$—$R_7$ depicted in FIG. 7 may be designed such that when the first capacitor C1 is fully charged (or close to being fully charged) the second switching signal 505 causes the second switch S2 to be closed and the third switching signal 506 causes the third switch S3 to be opened, such that the circuit 104 transitions from the first state to the second state. In the second state, the first capacitor C1 discharges to the cells 101, 102 and the voltage across the first capacitor will decrease. The op-amp 501 and the resistors $R_4$—$R_7$ depicted in FIG. 7 may be designed such that when the first capacitor C1 is discharged to a given extent, the second switching signal 505 causes the second switch S2 to be opened and the third switching signal 506 causes the third switch S3 to be closed, such that the circuit 104 transitions from the second state to the first state. In the first state the first capacitor C1 is recharged from the cells 101, 102.

It will be appreciated that the above described processes causes the circuit 104 to repeatedly switch between the first state and the second state so as to cause the cells 101, 102 to undergo pulsed charging and discharging to and from the first capacitor C1. The cells 101, 102 may, for example, undergo pulsed charging and discharging at a frequency which is greater than about 0.5 Hertz. In some embodiments the frequency at which the pulsed charging and discharging occurs may be less than about 10 Hertz.

In the embodiment shown in FIG. 7, the inductor L and the resistor $R_2$ act to limit any current surges into the second capacitor $C_2$. In some embodiments, the inductor may have an inductance of approximately 1 µH. The resistor $R_2$ may have a resistance of approximately 0.03 Ohms. The resistor $R_2$ also acts as a balancing resistor whose resistance may be adjusted to alter a time constant of the circuit. The resistor $R_2$ may be adjusted according to a desired resolution and accuracy of the circuit and/or the number of parallel cells.

In some embodiments the first capacitor $C_1$ may have a capacitance of approximately 1 F. The second capacitor $C_2$ may have a capacitance of approximately 10 mF. In such embodiments, the resistor $R_4$ may have a resistance of approximately 12 K Ohms. The resistor $R_5$ may have a resistance of approximately 1.2 K Ohms. The resistor $R_6$ may have a resistance of approximately 10 K Ohms. The resistor $R_7$ may have a resistance of approximately 1.1 K Ohms. In such embodiments the diode 502 may be considered to be an ideal diode with no voltage drop across the diode 502 when it is conducting. However, the resistances of the resistors $R_4$—$R_7$ may be adjusted in order to account for a voltage drop across the diode 502, which may occur in practice as will be appreciated by a person of ordinary skill in the art.

In the embodiment of FIG. 7, the second switch S2, the third switch S3, the op-amp 501, resistors $R_4$—$R_7$ and the inverter 502 are arranged to form a switching device 106 operable to switch the circuit between the first state and the second state. The second switch S2, the third switch S3, the op-amp 501, resistor $R_4$—$R_7$ and the invertor 502 may therefore together be considered to form an embodiment of a switching device 106. A switching device 106 according to embodiments of the invention may further be considered to include the first switch S1 such that the switching device 106 is further operable to switch the circuit to the third state in which the second capacitor C2 is connected to draw current from the battery cells so as to charge the second capacitor C2.

The controller 503 may be configured to control the first switch S1 to interrupt the repeated switching of the circuit 104 between the first and second states and to switch the circuit to the third state so as to charge the second capacitor C2 from the cells 101, 102. As shown in FIG. 7, the controller 503 may receive an input 507 corresponding to the output of the op-amp 501. The controller 503 may therefore monitor the state of the circuit 104 from the input 507 provided to the controller 503 and may control the first switch S1 in dependence on the input 507. For example, if the input 507 indicates that the second capacitor needs recharging, the controller 503 may output a first switching signal 504 which causes the first switch S1 to be closed such that the circuit 104 is switched to the third state in which the second capacitor C2 is charged.

In other embodiments, the controller 503 may control the first switch S1 to switch the circuit 104 to the third state on a periodic basis. For example, the circuit 104 may be switched to the third state after a given time period has passed. The time period may, for example, be a predetermined time period.

It will be appreciated, that a switching device operable to switch the circuit between the first and second states (and optionally to a third state) may take many different suitable forms. References herein to a switching device should not therefore be interpreted to be limited to the example presented with reference to FIG. 7. Furthermore, whilst the charge storage device is realised in the form of two capacitors in the embodiment shown in FIG. 7, in other embodiments, the charge storage device may take any suitable form.

In general a circuit comprising a charge storage device and a switching device, according to the invention may take any suitable form to perform the functions described herein.

As was explained above, providing pulsed charging and discharging of the cells 101, 102 to and from a charge storage device (e.g. the first capacitor C1) promotes self-balancing currents to flow between the cells 101, 102 so as to reduce any capacity difference between the cells 101, 102. As was further described above, capacity differences may, in particular, develop between cells during periods when little or no current flows to or from the cells, such as when the battery is placed in storage.

In general, a state in which the magnitude of an electrical current flowing to or from a battery through an external connection (e.g. a connection to an external load and/or to a power supply for charging of the battery) is less than a threshold current, may be referred to as an idle state of the battery. An idle state, may occur for example, when no external devices are connected to the battery or when no electrical power is required to be delivered from the battery or delivered to the battery for charging. Alternatively an idle state may occur when a current is being drawn from the battery, or delivered to the battery but the magnitude of the current is relatively low. The threshold current may, for example, correspond to a current which flows to or from the battery through an external connection when the battery is being charged or discharged at a rate of approximately 0.01 C. The charge/discharge rate which corresponds to the threshold current may, in general, be less than about 0.05 C, may be less than about 0.03 C or may even be about 0.01 C or less.

It may be particularly advantageous to provide pulsed charging and discharging of a battery when the battery is in an idle state, in order to reduce any capacity differences which may develop between parallel cells during an idle state. The circuit 104 may therefore be configured to repeatedly switch the circuit 104 between the first and second states when the battery is in an idle state.

In some embodiments, a controller 107 (as depicted in FIG. 1) may be provided which is operable to switch between a first mode in which the switching device 106 repeatedly switches the circuit between the first state and the second state and a second mode in which the switching device does not switch the circuit between the first state and the second state. The controller 107 may, for example, be the same as the controller 503, which is shown in FIG. 7 and was described above, or may be a different controller. The controller 107 may, for example, be operable to operate one or more switches so as to connect and/or disconnect connections to one or more elements of the circuit 104 so as to switch between the first mode and the second mode.

The controller 107 may, for example, switch to the first mode when the battery is in an idle state and may switch to the second mode when the battery is not in an idle state. This may prevent pulsed charging and discharging of the cells to the charge storage device, at times when substantial currents are flowing between the cells and an external device.

In some embodiments, the controller 107 may be configured to switch between the first mode and the second mode when the battery is in the idle state. For example, it may be more energy efficient to only deliver pulsed charging and discharging at some times when the battery is in an idle state and to not deliver pulsed charging and discharging at other times when the battery is in the idle state. Whilst, charge may be transferred to and from the charge storage device 105 to the cells 101, 102 relatively efficiently, such transfer may still result in the loss of some energy. It may therefore be desirable to limit the performance of pulsed charging and discharging at certain times in order to avoid unnecessary discharge of the cells 101, 102. For example, it may be sufficient to only switch into the first mode so as to perform pulsed charging and discharging during some of the time in which the battery is in the idle state.

The controller 107 may be configured to switch between the first mode and the second mode on a periodic basis when the battery is in an idle state. For example, when the battery is in the idle state the controller 107 may switch to the first mode for approximately an hour during every 24 hour period. In some embodiments, an hour of performing pulsed charging and discharging may be sufficient to correct any capacity differences which have developed between parallel cells whilst the battery has been in the second mode. In other embodiments, the time periods between successively switching to the first mode and/or the time period for which the battery is in the first mode before being switched back to the second mode may be different. The time periods may be adjusted to suit particular applications.

In some embodiments the controller 107 may be configured to determine that the battery is in an idle state. For example, the battery management system may monitor one or more properties of the battery and the controller 107 may determine that the battery is in the idle state in dependence on the one or more measured properties. The battery management system may, for example, include a current monitoring device arranged to measure a current flowing to or from the battery through an external connection (e.g. to an external load and/or from a power supply delivering a charging current). If the controller 107 determines that the measured current falls below a threshold current then the controller 107 may determine that the battery is in an idle state.

In some embodiments, the controller 107 may determine when to switch between the first and second states based upon the measured current to or from the battery through an external connection. For example, the interval periods between switching to the first mode may be varied depending on the magnitude of an electrical current flowing to or from the battery through an external connection. Additionally or alternatively the time for which the first mode is maintained before switching back to the second mode may be varied depending on the magnitude of an electrical current flowing to or from the battery through an external connection.

For example, if there is some current flowing to or from the battery through an external connection, then this may cause some self-balancing to occur between parallel cells. However, the magnitude of the current may be sufficiently small (e.g. the current may be less than a threshold current) that the battery is considered to be an idle state. The small magnitude of the current may also mean that capacity differences may still develop between parallel cells and as such it may be advantageous to provide some pulsed discharging and charging to and from the cells in order to reduce any such capacity differences. However, due to the small external current which is flowing it may take longer for capacity differences to develop than if no external current was flowing. The time period between switching to the first mode may therefore be increased, relative to a situation in which substantially no external current is flowing. Additionally or alternatively the time period between switching to the first mode and switching back to the second mode may be decreased such that pulsed charging and discharging is performed for a shorter period of time.

In general the controller 107 may switch to the first mode at any suitable time and for any suitable time period in order to promote self-balancing currents to flow between parallel cells in order to reduce capacity differences between the parallel cells. The times at which the controller 107 switches between the first and second modes may be determined according to a pre-determined schedule or may be variable based upon one or more measured properties of the battery.

Whilst embodiments have been described above in which a battery comprises two cells connected in parallel with each other, in other embodiments a battery may comprise more than two cells. In general, the disclosures made herein are applicable to any battery comprising at least two cells connected in parallel with each other. The battery may comprise more than two cells connected in parallel with each other and may additionally comprise cells which are connected in series with each other.

Embodiments have been described above in which a circuit 104 is connected across a plurality of cells 101, 102 which are connected in parallel with each other. In some embodiments a circuit of the type describe above may be connected across a single cell, which is connected in parallel with at least one other cell. In general a circuit 104 may be connected across at least one cell, which is connected in parallel with at least one other cell. In some embodiments, a battery management system may comprise a plurality of circuits of the type described above. Each circuit may be connected across at least one battery cell and may be operable to cause pulsed charging and discharging of the at least one battery cell. For example, in some embodiments a first circuit may be connected across a first battery cell and may be operable to cause pulsed charging and discharging of the first battery cell and a second circuit may be connected across a second battery cell and may be operable to cause pulsed charging and discharging of the second battery cell. The first and second battery cells may be connected in parallel with each other and the pulsed charging and discharging of the cells may promote self-balancing currents to flow between the cells.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A battery management system for a battery comprising a plurality of battery cells connected in parallel with each other, the battery management system comprising:
    an electronic circuit for connection across at least one of the plurality of battery cells, the electronic circuit comprising:
        a charge storage device to store charge discharged from the at least one battery cell; and
        a switching device to switch the electronic circuit between a first state in which charge is discharged from the at least one battery cell and directed to the charge storage device for charging of the charge storage device and a second state in which charge is discharged from the charge storage device and directed to the at least one battery cell for charging of the at least one battery cell; and
        wherein the switching device to repeatedly switches the electronic circuit between the first state and the second state so as to cause the at least one battery cell to undergo pulsed charging and discharging to and from the charge storage device.

2. The battery management system of claim 1, wherein the electronic circuit repeatedly switches the electronic circuit between the first state and the second state when the battery is in an idle state, wherein the idle state is a state in which the magnitude of an electrical current flowing to or from the battery through an external connection is less than a threshold current.

3. The battery management system of claim 1 or 2, further comprising a controller to switch between a first mode in which the switching device repeatedly switches the electronic circuit between the first state and the second state and a second mode in which the switching device does not switch the electronic circuit between the first state and the second state.

4. The battery management system of claim 3 as dependent on claim 2, wherein the controller periodically switches between the first mode and the second mode when the battery is in the idle state.

5. The battery management system of claim 3 or 4, wherein the controller determines that the battery is in an idle state.

6. The battery management system of claim 5, further comprising a current monitoring device to measure an electrical current flowing to or from the battery through an external connection.

7. The battery management system of claim 6, wherein the battery management system determines that the battery is in the idle state when the measured electrical current falls below a threshold current.

8. The battery management system of claim 6 or 7, wherein the controller determines when to switch between the first and second modes based upon the measured electrical current flowing to or from the battery through an external connection.

9. The battery management system of any preceding claim, wherein the switching device causes the at least one battery cell to undergo pulsed charging and discharging to and from the charge storage device at a frequency of greater than about 0.5 Hertz.

10. The battery management system of any preceding claim, wherein the switching device causes the at least one battery cell to undergo pulsed charging and discharging to and from the charge storage device at a frequency of less than about 10 Hertz.

11. The battery management system of any preceding claims, wherein the electronic circuit comprises a DC to DC converter circuit.

12. The battery management system of any preceding claim, wherein the charge storage device comprises at least one capacitor.

13. The battery management system of claim 12, wherein the charge storage device comprises a first capacitor and the electronic circuit further comprises a second capacitor, and wherein the switching device switches the electronic circuit between the first state in which the first capacitor is connected to draw current from the at least one battery cell and charge the first capacitor and the second state in which the first capacitor and the second capacitor are connected in series with each other so as to supply current to the at least one battery cell.

14. The battery management system of claim 13, wherein the capacitance of the second capacitor is at least 10 times greater than the capacitance of the first capacitor.

15. The battery management system of claim 13 or 14, wherein the switching device switches the electronic circuit to a third state in which the second capacitor is connected to draw current from the at least one battery cell so as to charge the second capacitor.

16. The battery management system of claim 15, further comprising a controller controls the switching device to interrupt the repeated switching of the electronic circuit between the first and second states and to switch the electronic circuit to the third state so as to charge the second capacitor from the at least one battery cell.

17. A battery comprising a plurality of battery cells connected in parallel with each other and a battery management system of any preceding claim.

18. The battery of claim 17, wherein the plurality of battery cells are lithium sulphur battery cells.

19. A method for controlling a battery comprising a plurality of battery cells connected in parallel with each other, the method comprising:
    repeatedly switching an electronic circuit connected across at least one of a plurality of battery cells between a first state and a second state, wherein in the first state charge is discharged from the at least one battery cell and directed to a charge storage device for charging of the charge storage device and in the second state charge is discharged from the charge storage device and directed to the at least one battery cell for charging of the at least one battery cell;

wherein the repeated switching of the electronic circuit between the first state and the second state causes the at least one battery cell to undergo pulsed charging and discharging to and from the charge storage device.

\* \* \* \* \*